United States Patent [19]

Tsurushima

[11] 3,911,220

[45] Oct. 7, 1975

[54] MULTISOUND REPRODUCING APPARATUS

[75] Inventor: Katsuaki Tsurushima, Yokohama, Japan

[73] Assignee: Sony Corporation, Tokyo, Japan

[22] Filed: Aug. 4, 1972

[21] Appl. No.: 278,047

[30] Foreign Application Priority Data

| | | |
|---|---|---|
| Aug. 6, 1971 | Japan | 46-59483 |
| Aug. 16, 1971 | Japan | 46-62104 |

[52] U.S. Cl. ...................... 179/1 GQ; 179/100.4 ST

[51] Int. Cl.[2] ............................................ H04R 5/00

[58] Field of Search ............ 179/1 GQ, 1 G, 15 BT, 100.4 ST, 100.1 TD

[56] References Cited

UNITED STATES PATENTS

| | | | |
|---|---|---|---|
| 3,632,886 | 1/1972 | Scheiber | 179/1 GQ |
| 3,708,631 | 1/1973 | Bauer | 179/1 GQ |
| 3,798,373 | 3/1974 | Bauer | 179/1 GQ |

OTHER PUBLICATIONS

4 Channels and Compatability, Scheiber, AES Preprint, Oct. 1970.

*Primary Examiner*—William C. Cooper
*Assistant Examiner*—Thomas D'Amico
*Attorney, Agent, or Firm*—Lewis H. Eslinger; Alvin Sinderbrand

[57] ABSTRACT

A decoder for a matrix four channel system of the type in which a logic network senses the amplitudes and phase positions of the signals in each channel and derives control signals for controlling the transmitting condition of a variable transmission means associated with each of four loudspeakers. The logic network of the invention includes two automatic gain control amplifiers for stabilizing the operation of the variable transmission means and also time constant circuits for controlling the variable transmission means.

2 Claims, 9 Drawing Figures

MULTISOUND REPRODUCING APPARATUS

BACKGROUND OF THE INVENTION

1. Field of the Invention

The invention relates to decoding circuits for use in multisound reproducing apparatus, and more particularly to improved logic circuit networks for eliminating undesirable spurious signals generated in the decoder.

2. Description of the Prior Art

A so-called matrix four channel system has been heretofore proposed in which four original sound signals (which, for convenience, are identified as $L_f$, $L_b$, $R_f$ and $R_b$ for "left front," "left back," "right front" and "right back," respectively) are converted into signals of only two channels by matrix networks known as encoders for transmission by or recording on conventional two channel media such as FM multiplex radio or magnetic tape. These encoded signals are then later decoded to four signals by matrix networks known as decoders.

It is preferred that the corresponding original sound signals by reproduced from separate loudspeakers. With such a matrix four channel stereo system, however, in addition to the corresponding original sound signals, another sound, reproduced through another loudspeaker, is at the same time reproduced as a crosstalk, which is an obviously undesirable result.

In order to avoid such undesired crosstalk signals it has been proposed to use a gain control amplifier with a logic circuit. When a sound source is located only at the left front of a hypothetical listener, the logic circuit operates to reproduce the corresponding signal from the loudspeaker located at the left front of the listener. In order to perform such an operation, the full-wave rectified $L_f$ signal and the full-wave rectified $R_f$ signal are subtracted from each other and the difference is applied as a first control signal to a first pair of variable transmission means, for example, variable gain control amplifiers connected in output channels. Similarly, the full-wave rectified $L_b$ signal and the full-wave rectified $R_b$ signal are subtracted from each other and the difference signal is then applied as a second control signal to a second pair of variable transmission means, for example, variable gain control amplifiers connected in the output channels. This form of logic circuit control which produces such first and second control signals is referred to as wave-form matching logic.

With a conventional apparatus, if a sound source is positioned at the front center of the back center in an original sound field, a second logic circuit is provided which operates to reproduce the corresponding signal from a loudspeaker located respectively at the front center or the back center in the reproducing sound field. The second logic circuit is called a front-back logic which produces third and fourth control signals by summing and subtracting two signals encoded by the encoder. These third and fourth control signals are used to control the gains of pairs of gain control amplifiers with the result that crosstalk caused by center-front signals or center-back signals is reduced.

Due to the fact that the logic circuits mentioned above control the gain control amplifiers based upon the loudness of the sound signal to be reproduced through the decoder rather than upon its energy, automatic gain control amplifiers are provided at the input side of the logic circuit. The logic circuit is described in detail in the Japanese Pat. Publication No. 20/1972.

It is, however, rather difficult to set the output characteristics of the automatic gain control amplifiers at desired values due to the fact that sound signals are random over a wide range in their levels and frequencies. For this reason, the automatic gain control amplifiers are only incorporated in the input circuit of the waveform matching logic as described above and not in the input circuit of the front-back logic circuit. Accordingly, in the prior art there is the problem that the front-back logic circuit will become unstable.

Gain control amplifiers used in such a conventional apparatus have a time constant circuit which is very rapid in rising but mild in falling and are designed to have such a response that when a negative control signal with a predetermined value is applied thereto its gain becomes zero, while when a positive control signal with a predetermined value is applied thereto its gain becomes maximum, for example, 3 dB. When no control signal is applied thereto its gain becomes lower by 3 dB from the maximum value. As a result of this, in some prior art apparatus, according to the condition of the control signals, a reproduced sound skips from one loudspeaker to another loudspeaker abruptly or even if no sound signal to be reproduce exists the gain of the amplifiers increases suddenly with the result that noises of the circuit system also increase suddenly.

SUMMARY OF THE INVENTION

In a multisignal transmission apparatus of the type adapted to receive first and second composite signals $L_T$ and $R_T$ respectively containing dominant signals $L_f$ and $R_f$ in phase with each other and each including two subdominant signal components $L_b$ and $R_b$, with the subdominant signals $L_b$ and $R_b$ in one of said composite signals being substantially in quadrature relationship with the subdominant signal components $L_b$ and $R_b$ in the other of said composite signals and with one of the $L_f$ and $R_f$ signals being in phase opposition with its respective associated $R_b$ or $L_b$ signal component and the other in phase with its associated signal component, the apparatus of the invention comprises first and second input terminals to be applied with the first and second composite signals, respectively, a first and a second pair of all-pass phase-shifting networks connected to the first and second input terminals, respectively, and one all-pass phase-shifting network of each pair being respectively operative to produce signals corresponding to the first and second composite signals but shifted in phase by ninety degrees, combining networks connected to the two input terminals and to the output terminals of the ninety degree all-pass phase-shifting networks to produce third and fourth composite signals respectively containing the dominant signal components $L_b$ and $R_b$ and each including $L_f$ and $R_f$ signals as subdominant components and means for applying the first, third, fourth and second composite signals respectively containing the dominant signal components $L_f$, $L_b$, $R_b$ and $R_f$ to first, second, third and fourth variable gain control means, respectively, for reproduction over four corresponding loudspeaker circuits. The logic portion of the system includes two automatic gain control means connected to the output terminal of the ninety degree all-pass phase-shifting network of one pair of all-pass phase-shifting networks and to one of the non-ninety degree all-pass phase-shifting networks of the other pair of such networks to transfer the ninety degree phase-shifted first or second composite signal and the other of the first and second composite signals and further to produce at its output terminals signals representative of the input signals applied to the automatic gain control means but substantially constant in amplitude. Means are provided for producing a plurality of control signals, the control signal means including first, or wavematching logic circuit means having input terminals connected to the output terminals of the automatic gain control means and operative to identify the dominant signal or signals instantaneously appearing at the output of the automatic gain control means to produce first and second control signals of opposite polarities, second, or front-back logic circuit means having input terminals connected between the output terminals of the automatic gain control means and the input terminals of the first logic circuit means to take the sum and difference of the $L_T$ and $R_T$ signals and to produce third and fourth control signals of opposite polarities, and means for applying the first and third control signals to control the first and fourth variable gain amplifiers and for applying the second and fourth control signals to control the second and third variable gain amplifiers.

Accordingly, it is an object of the invention to provide a multisignal transmission apparatus which has a minimum number of automatic gain control amplifiers and which produces input signals from the amplifiers to wave-matching and front-back logic circuits.

It is another object of the invention to provide a multisignal transmission apparatus which has logic circuit means with a small number of parts to be adjusted and is therefore low in cost.

It is a further object of the invention to provide a multisignal transmission apparatus in which the reproduced sound signal is prevented from being skipped from one loudspeaker to another.

It is yet another object of the invention to provide a multisignal transmission apparatus in which sounds reproduced from a plurality of loudspeakers are stable in position.

The foregoing and other objectives, features, and advantages of the invention will by more readily understood upon consideration of the following detailed description of certain preferred embodiments of the invention, taken in conjunction with the accompanying drawings.

DESCRIPTION OF CERTAIN PREFERRED EMBODIMENTS

For a better understanding the invention an encoder will be now described which converts four original sound signals $L_f$, $L_b$, $R_f$ and $R_b$ into two composite signals $L_T$ and $R_T$.

Figure 1:
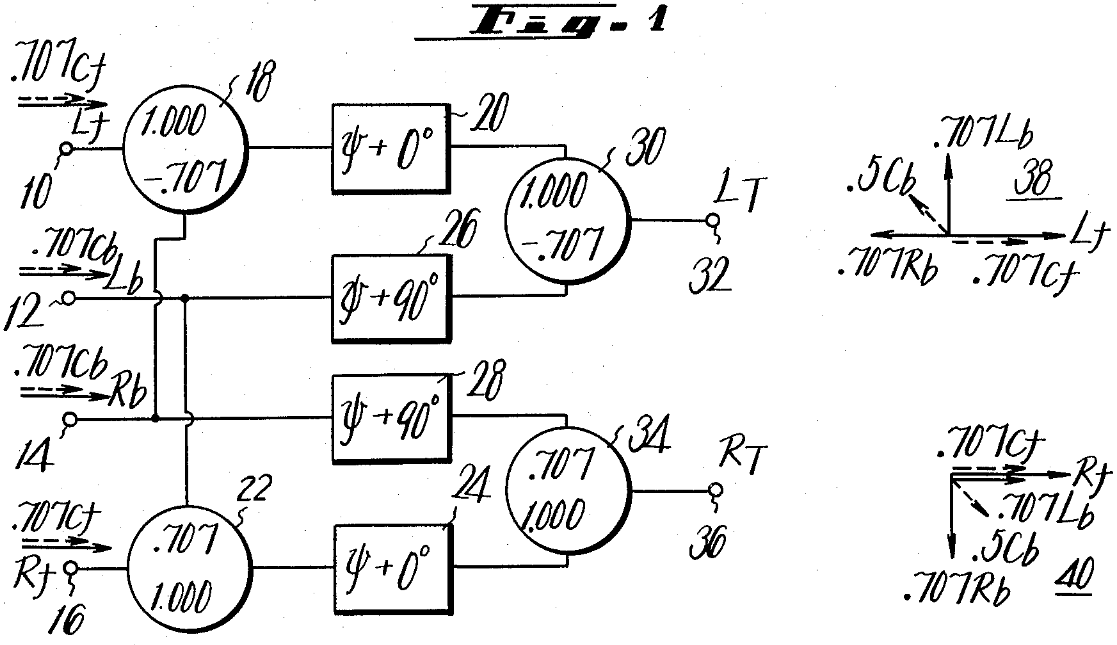
FIG. 1 is a schematic diagram illustrating an encoder for a better understanding of the invention.

An encoder as illustrated in FIG. 1 has four input terminals 10, 12, 14 and 16 to which four input signals $L_f$, $L_b$, $R_b$ and $R_f$ depicted as in-phase signals of equal amplitude, are respectively applied. The total $L_f$ signal is added in a summing junction 18 to −0.707 of the $R_b$ signal. The output of this summing junction 18 is applied to a phase-shifting nitwork 20 which introduces a reference phase-shift Ψ which is a function of frequency. The full $R_f$ signal at the terminal 16 is added in a summing junction 22 to 0.707 of the $L_b$ signal appearing at the input terminal 12, and the output of the summing junction 22 is applied to a Ψ-network 24, which also provides the reference phase-shift Ψ. The $L_b$ and $R_b$ signals are also applied to respective Ψ-networks 26 and 28, each of which provides a phase shift of Ψ + 90°. It should here be noted that the angular notation used refers to lagging angles, but as long as there is consistency in notation, it makes no difference to the operation of the system whether the angles are lagging or leading.

The full signal appearing at the output of the network 20 is added in a summing junction 30 to −0.707 of the signal appearing at the output of the network 26 to produce at its output terminal 32 a composite signal designated $L_T$. Similarly, the full signal from the network 24 is added in a summing junction 34 to 0.707 of the signal from the network 28, the latter in this case being in the positive sense. The signal appearing at an output terminal 36 of the summing junction 34 is the composite signal $R_T$. The signal $L_T$ and $R_T$ may be recorded on any two-channel medium such as a two-track tape or stereophonic record for later reproduction, or may be transmitted by FM multiplex radio.

The composite signals $L_T$ and $R_T$ appearing at the output terminals 32 and 36 are portrayed as phasor groups 38 and 40. The two composite signals $L_T$ and $R_T$ encoded by the encoder shown in FIG. 1 may be decoded into four signals by decoders constructed in accordance with the invention and shown in FIGS. 2A and 2B.

Figure 2A:
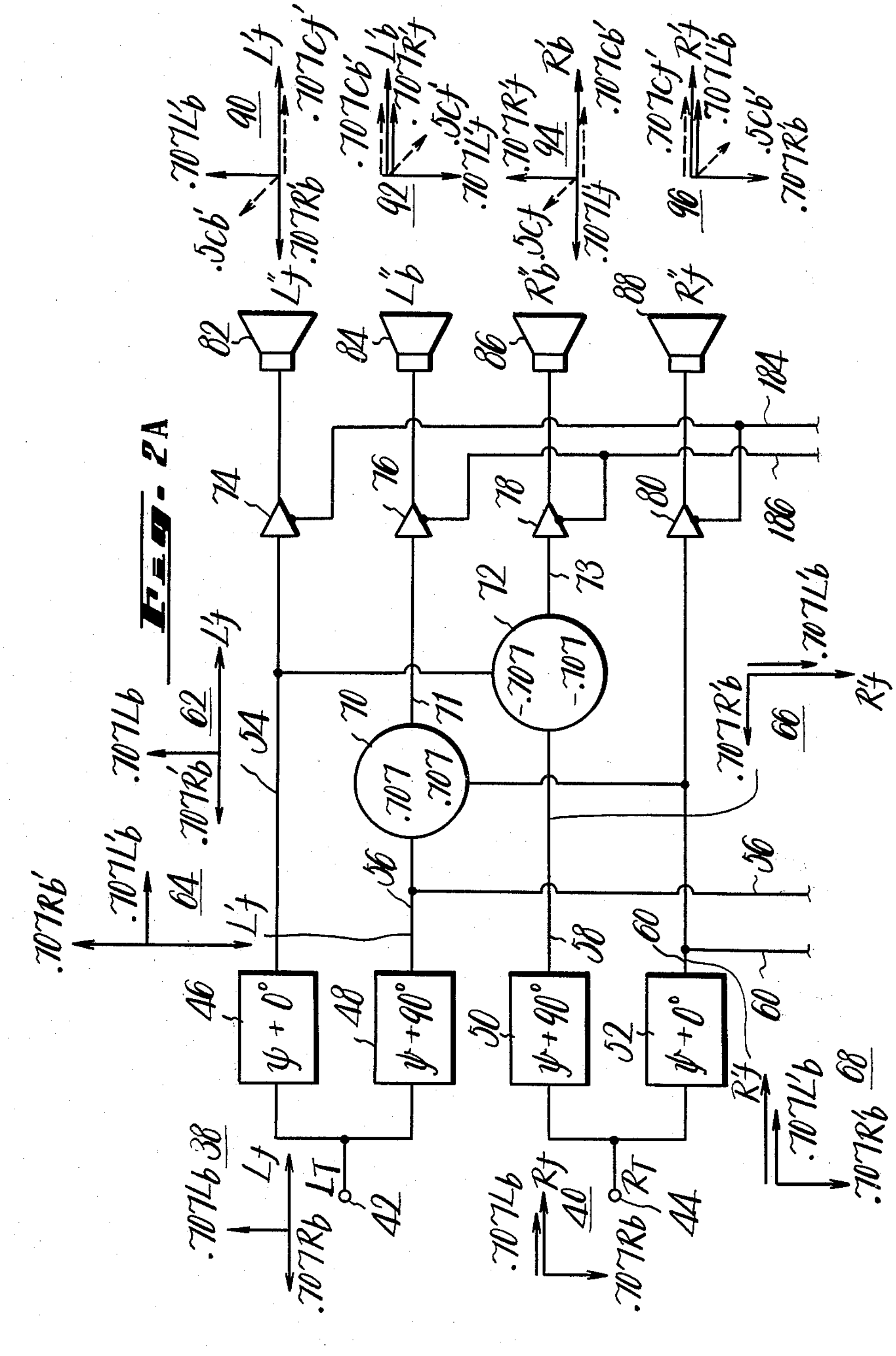
FIGS. 2A and 2B are respectively schematic diagrams illustrating a decoder according to one preferred embodiment of the invention.

As shown in FIG. 2A, in one preferred embodiment the input signals to the decoder, designated $L_T$ and $R_T$ and depicted by the phasor groups 38 and 40, respectively, are applied to respective input terminals 42 and 44. The $L_T$ signal is applied in parallel to a pair of all-pass phase shifting networks 46 and 48 which introduce phase shifts of (Ψ + 0°) and (Ψ + 90°), respectively, and the $R_T$ signal is similarly applied to a pair of all-pass networks 50 and 52 which provide phase shifts of (Ψ + 90°) and (Ψ +0°) respectively. The four phase-shift shift networks 46, 48, 50 and 52 are operative to produce four signals, depicted by phasor groups 62, 64, 66 and 68, respectively, at their output terminals which are connected respectively to conductors 54, 56, 58 and 60. To distinguish these signals from the encoded input signals, and to signify that they have passed through a set of phase-shift networks with a common phase-shift Ψ, the designations of the components of the phase-shifted signals are primed.

The signals appearing on the conductors 56 and 60 are each multiplied by the coefficient 0.707 and are added together at a summing junction 70 to produce a new signal at its output terminal or conductor 71, while the signals on conductors 54 and 58 are multiplied by the coefficient −0.707 and are added together in a summing junction 72 to produce a second new signal at its output terminal or conductor 73. The signals on conductors 54, 71, 73 and 60 are amplified by gain control amplifiers 74, 76, 78 and 80, respectively, and are thereafter applied to corresponding loudspeakers 82, 84, 86 and 88 where they are reproduced as sounds which correspond to the configuration of phasor groups 90, 92, 94, and 96, respectively.

It will be noted that the phasor groups 90, 92, 94 and 96 which characterize the sounds emanating from the four loudspeakers 82, 84, 86 and 88, respectively, and which are usually placed in a listening room or area so that the signals $L''_f$, $L''_b$, $R''_b$, and $R''_f$ are localized at the left front, left back, right back and right front corners, contain dominant signals $L'_f$, $L'_b$, $R'_b$ and $R'_f$; however, they each also contain diluting or side-effect signals from two other channels. Although these side-effect signals are relatively unobjectionable in the thus far described matrix configuration, the perfection of quadraphonic sound reproduction is enhanced if the gains of those channels which contain only side-effect signals are controllably diminished. This can be accomplished by using gain controlled amplifiers instead of fixed gain amplifiers for the amplifiers 74, 76, 78 and 80 and varying the gains thereof in response to a control voltage derived by an electronic logic system. The present invention, in another aspect thereof, is concerned with an improved logic circuit which will now be described in the environment of the improved matrix illustrated in FIG. 2A.

Figure 2B:
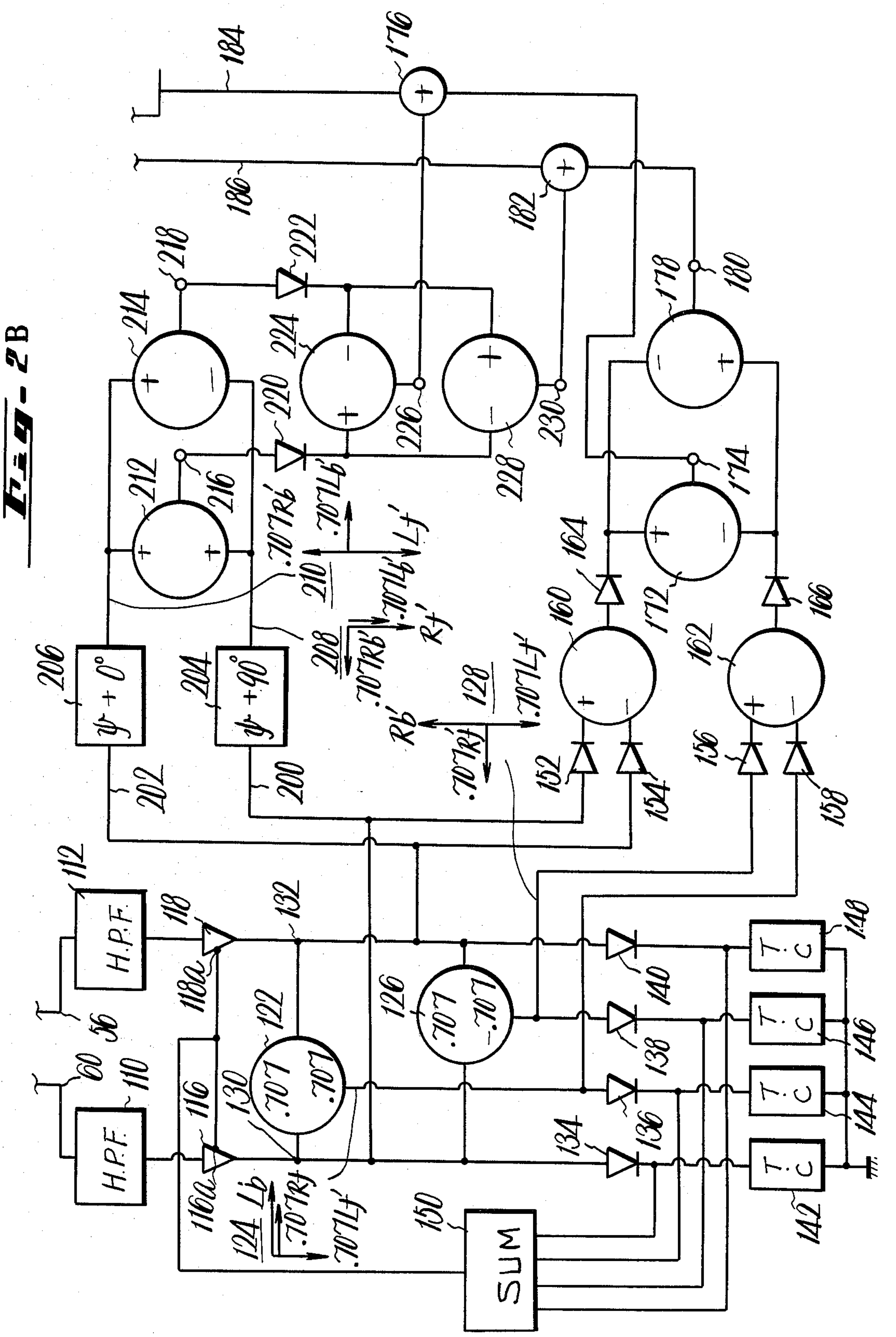

Referring now to FIG. 2B, the electronic logic circuit according to the present invention is operative to develop control signals for the gain control amplifiers by operating on two signals developed in the matrix of FIG. 2A, preferably the signals appearing on the conductors 60 and 56. To ensure that the signals to be operated upon by the logic circuit are relatively uniform regardless of the signal strength of the program being reproduced, the signals from the conductors 60 and 56 are first coupled through substantially identical, high pass filters 110 and 112, respectively, which are designed to reject frequencies below about 50Hz-frequencies which normally should not be involved in the logic action. The transmission characteristic of the filters above the cutoff point is preferably adjusted so as to optimize the logic control action in accordance with the sensitivity of the ear to the loudness of various sounds.

The signals delivered by the high pass filters 110 and 112 are applied to the input terminals of respective automatic gain control amplifiers 116 and 118 which have identical or closely similar gain versus control voltage characteristics. It will be observed that the signals from conductors 60 and 56 applied to the amplifiers 116 and 118, respectively, are obtained from the outputs of all pass phase-shift networks 52 and 48, respectively, whereby corresponding components of the $R_T$ and $L_T$ composite signals are shifted in phase relative to each other by 90°. This phase relationship permits the signals delivered by the gain control amplifiers 116 and 118 to be added and subtracted to derive two new signals having properties advantageous to the desired performance of the logic circuit. Specifically 0.707 of each of the signals from amplifiers 116 and 118, appearing at their output terminals 130 and 132, respectively, are added in a summing junction 122 to produce at its output terminal a new signal represented by a phasor group 124, in which the component $L'_b$ is predominant. Similarly, −0.707 of the signal from amplifier 118 is added in another summing junction 126 to 0.707 of the signal from amplifier 116 to produce at its output terminal a difference signal represented by a phasor group 128, in which the component $R'_b$ is predominant. At the same time, the predominant component of the signals appearing at terminals 130 and 132 are $R'_f$ and $L'_f$ respectively.

The four signals just described are rectified by respective rectifiers 134, 136, 138 and 140, which are preferably full-wave rectifiers and which include respective time constant circuits 142, 144, 146 and 148, each designed to provide a rapid attack time and a relatively slower decay time. The four rectified signals are added together in a summing junction 150 and the sum signal is applied to the control electrodes **116*a* and 118*a* of the gain control amplifiers 116 and 118,** respectively. Application of the sum of the rectified signals in the illustrated feedback relationship automatically and simultaneously adjusts the gains of the amplifiers in response to changes in the strength of the signals being processed, thereby maintaining the amplitude of the rectified signals essentially constant.

Summarizing the function of the control circuit thus far described, it selects the signals represented by the phasor groups 68 and 64 for the logic operation and maintains them all at a relatively constant level. It will be observed that in two of these phasor groups, namely, in groups 68 and 64, the signal components 0.707 $L'_b$ and 0.707 $R'_b$ are either in phase-coincidence or in phase-opposition. These signals can be utilized in a wave-matching arrangement to ascertain if either an $L'_b$ or an $R'_b$ signal component is present. Also, as has already been noted, when these two signals are added and subtracted in the junctions 122 and 126, two new signals, represented by phasor groups 124 and 128, are obtained in which the components 0.707 $L'_f$ and 0.707 $R'_f$ are also either in phase-coincidence or in phase-opposition, and thus they can be used to ascertain of an $L'_f$ or an $R'_f$ signal component is present in the circuit.

Following the principles of the wave-matching technique described in the co-pending application Ser. No. 272,439, filed on July 17, 1972 by K. Tsurushima and having a common assignee with the present application, for ascertaining the presence in the circuit of $L'_b$, R'hd b, $L'_f$ or $R'_f$ signal components, the four signals that are applied to the rectifiers 134, 136, 138 and 140 to develop the gain control signal are also applied to the rectifiers 152, 158, 156 and 154, respectively, which are preferably full-wave rectifiers. The rectified outputs therefrom are then subtracted in pairs in the subtracting junctions 160 and 162. Specifically, the rectified signal appearing at the output terminal of the rectifier 154 is subtracted in the junction 160 from the rectified signal appearing at the output terminal of the rectifier 152 and the signal rectified by the rectifier 158 corresponding to the phasor group 124 is subtracted in the junction 162 from the signall rectified by the rectifier 156 corresponding to the phasor group 128.

The output signals from the junctions 160 and 162 are again rectified by rectifiers 164 and 166, respectively, which preferably are also full-wave rectifiers. The output signal from the rectifier 166 is subtracted in a subtracting junction 172 from the output signal from the rectifier 164 and the subtracted or difference signal appearing at its output terminal 174, which represents the contribution of the wave-matching logic to the control signal for the gain control amplifiers 74 and 80 in FIG. 2A, is applied as one input signal to a summing junction 176. The output signal from the rectifier 164 is subtracted in a subtracting junction 178 from the output signal of the rectifier 166 and the subtracted or difference signal appearing at its outpuut terminal 180, which represents the contribution of the wave-matching logic to the control signal for the gain control amplifiers 76 and 78 in FIG. 2A, is applied as one input signal to a summing junction 182.

To briefly review the action of the wave-matching logic, if, for example, either or both of the $L_f$or $R_f$ signals are present, since they would be present in precisely equal amounts at the outputs of the junctions 122 and 126, the wave-matching of the rectified signals in the junction 162 would result in a zero signal output. At the same time, since the $L_f$ and $R_f$ signals at the terminals 130 and 132 are completely different and incoherent, wave-matching of the rectified signals applied to the junction 160 will not cause cancellation, and an output would be produced. For this signal condition, then, rectification of the outputs of junctions 160 and 162, and subtraction thereof in the junction 172, will produce a positive signal at the terminal 174.

Other signal conditions may result in correlation and cancellation in the junction 160 so as to produce zero output therefrom, while at the same time the signals applied to the junction 162 may be incoherent and thus produce an output signal, with the consequence that the output signal from the junction 178 would be of positive polarity.

The signals delivered by the junctions 176 and 182 are applied in parallel to transmission conductors 184 and 186, respectively. Thus, a positive signal appearing at the output of the junction 176 passes through the transmission conductor 184 and upon application to the control electrodes of amplifiers 74 and 80 increases their gains and enhances the signals $L'_f$ and $R''_f$ emanating from the loudspeakers 82 and 88, respectively.

Conversely, when either one or both of signals $L'_b$ or $R'_b$ are present, there is a net control voltage at the output of the rectifier 166, and a zero voltage at the output of the rectifier 164, resulting in a positive control signal at the output terminal 180 of the junction 178. The positive control signal on the transmission conductor 186 when applied to the control electrodes of the amplifiers 76 and 78 increases their gains and enhances the signals $L''_b$ and $R''_b$ reproduced by the loudspeakers 84 and 86.

The gain control amplifiers 74, 76, 78 and 80 preferably have time constants such as to permit a relatively rapid increase in gain in response to application of positively going control signals and a relatively slow decrease in gain when the gain control signal decreases.

If a monoaural sound exists in an original sound field at its center front or center back and the signal corresponding to the monoaural sound is converted into two composite signals by the encoder shown in FIG. 1, the center front signal $C_f$ appears in-phase with the $L_f$ signal of the phasor group 38 and also with the $R_f$ signal of the phasor group 40, respectively, while the center back signal $C_b$ appears in opposite phases in the phasor groups 38 and 40, respectively. In the phasor groups 38 and 40, the center back signal $C_b$ has its components in phase with the $R_b$ and $L_b$ signals, respectively. The $C_b$ signal in the phasor groups 38 and 40 is represented as a composite signal of its vector components.

If such a center front or center back signal $C_f$ or $C_b$ is converted into four signals by the decoder shown in FIG. 2A, the corresponding signal appears in the phasor groups 90 to 96, respectively. It should be noted here that the center back signal $C'_b$ in the phasor group 90 is in phase-opposition with that of the phasor group 96 and the center front signal $C'_f$ in the phasor group 92 is in phaseopposition with that of the phasor group 94. These center back and center front signals are undesirable because they cause crosstalk.

In the case where a center front or center back sound exists in an original sound field, means may be provided in the invention to reduce crosstalk signals which appear in respective phasor groups irrespective of the kind or the level of the sound. Such a means will be now described as a front-back logic circuit.

The signals for the front-back logic circuit are derived from the outputs of the automatic gain control amplifiers 116 and 118 in FIG. 2B which, it will be noted, are common with those used to derive the signals for the wave-matching logic, and which provide relatively constant level output signals corresponding to the phasor groups 64 and 68, respectively. The output signals of the automatic gain control amplifiers 116 and 118 are applied to Ψ-networks 204 and 206 by means of conductors 200 and 202, respectively. The Ψ-network 204 is designed to delay the signal passing therethrough by 90° with respect to that passing through the Ψ-network 206. The output signals of the Ψ-networks 204 and 206 are shown as phasor groups 208 and 210, which are respectively applied to a summing junction 212 and a subtracting junction 214. In the subtracting junction 214 the output signal from the Ψ-network 204 is subtracted from that of the Ψ-network 206.

It will be noted that the $L'_f$ and $R'_f$ signals in the two phasor groups 208 and 210 are in-phase with the consequence that if a "front center" signal is applied to the $L_f$ and $R_f$ terminals of the encoder of FIG. 1, equal amounts of such a front center signal would appear coincident with the $L'_f$ and $R'_f$ component signals in these phasor groups. Addition and subtraction of these phasor groups, under the circumstance in which there is a "center front" signal present, cause a greater total signal upon addition and a smaller total signal uupon subtraction. In contrast, if a "center back" signal were to be applied to the terminals $L_b$ and $R_b$ of the encoder of FIG. 1, such signals would appear out of phase in phasor groups 208 and 210 with the result that a smaller total signal results upon addition and a larger total signal is obtained upon subtraction.

The sum signal appearing at an output terminal 216 of the summing junction 212 and the difference signal appearing at an output 218 of the subtracting junction 214 are rectified by respective rectifiers 220 and 222, respectively. The output of the rectifier 222 is subtracted in a subtracting junction 224 from the output of the rectifier 220 and the difference signal appearing at the output terminal 226 of the subtracting junction 224, which represents the contribution of the front-back logic to the control signal for the gain control amplifiers 74 and 80 in FIG. 2A, is applied as another input signal to the summing junction 176. The output of the rectifier 220 is also subtracted in a subtracting junction 228 from the output of the rectifier 222 and the difference signal appearing at the subtracting junction output terminal 230, which represents the contribution of the front-back logic to the control signal for the gain control amplifiers 76 and 78 in FIG. 2A, is applied as the other input signal to the summing junction 182.

Consequently, if the center front signal is contained in the two composite signals $L_T$ and $R_T$ respectively, it is discriminated in the subtracting junction 224 to produce a positive control signal which is then applied to the gain control amplifiers 74 and 80 through the conductor 184 to increase their gain. At the same time, in the other subtracting junction 228 a negative control signal is produced, which is then applied to the gain control amplifiers 76 and 78 through the conductor 186 to reduce their gain. Thus, the crosstalk in the back channels is reduced. Further, if the center back signal is contained in the two composite signals $L_T$ and $R_T$, the circuit operates in the reverse manner with respect to the center front signal with the consequence that the gain of the gain control amplifiers 76 and 78 is increased but the gain of the amplifiers 74 and 80 is reduced to thereby reduce the crosstalk in the front channels.

Since the input signal to the front-back logic, which discriminates the center front or center back signal, is obtained from the output terminals of the automatic gain control amplifiers, which control the input signal to the wave-matching logic which controls the output signals to be reproduced by the loudspeakers 82 to 88, accurate discrimination can be positively carried out irrespective of the input level of the two composite signals $L_T$ and $R_T$.

Further, with the invention the two composite signals $L_T$ and $R_T$ can be controlled with two automatic gain control amplifiers, so that the circuit construction is simplified.

Figures 3A, 3B, 3C:
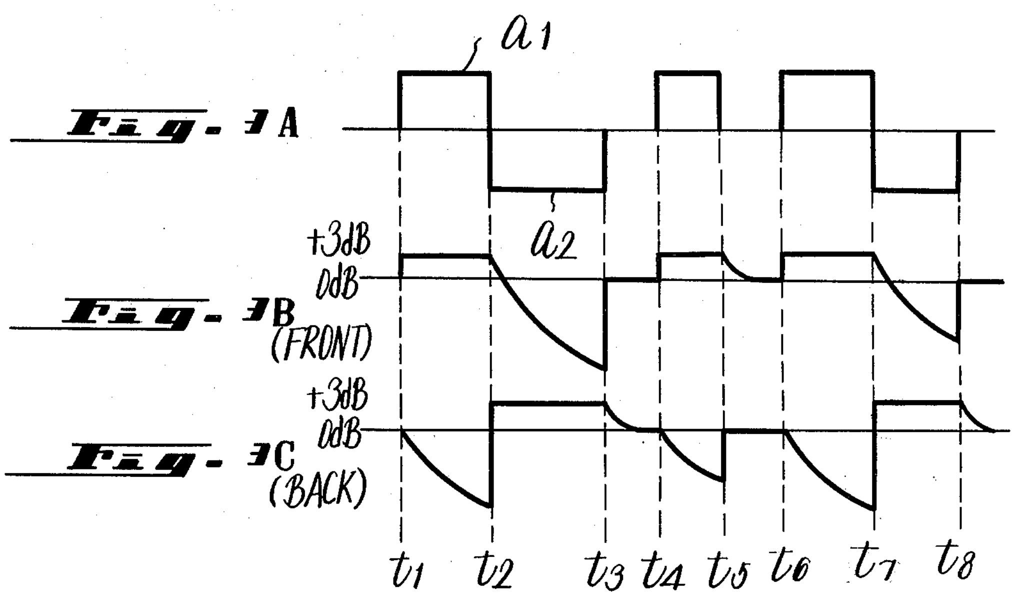
FIGS. 3A to 3C, inclusive, are waveform diagrams used for explaining the operation of the decoder shown in FIGS. 2A and 2B.

FIGS. 3A, 3B and 3C are waveform diagrams which show that the input terminals of the gain control amplifiers 74 to 80 are supplied with signals or not and how the gain control amplifiers 74 to 80 operate in association therewith. In FIG. 3A, a wave portion $a_1$ shows the case where only the front signals or the $L_f$ and $R_f$ signals are respectively contained in the composite signals $L_T$ and $R_T$ during the time periods between time points $t_1$ and $t_2$. In this case, the output from the rectifier 164 shown in FIG. 2B becomes greater than that from the rectifier 166 and hence the first gain control signal from the subtracting junction 172 becomes greater than the second gain control signal from the subtracting junction 178. Therefore, as shown in FIG. 3B, the gain of the amplifiers 74 and 80 abruptly rises to, for example, + 3 dB, while the gain of the amplifiers 76 and 78 becomes small gradually from that of the previous state with a predetermined time constant, as shown in FIG. 3C.

A wave part $a_2$ of FIG. 3A shows the case where the back signals or the $L_b$ and $R_b$ signals are only contained in the composite signals $L_T$ and $R_T$ during the time period between the time points $t_2$ and $t_3$. In this case the output from the rectifier 166 becomes greater than that from the rectifier 164 in FIG. 2B and the second gain control signal from the subtracting junction 178 becomes greater than that from the first gain control signal from the subtracting junction 172. Accordingly, as shown in FIG. 3B, the gain of the amplifiers 74 and 80 becomes small gradually from that of the previous state with a predetermined time constant, while, as shown in FIG. 3C, the gain of the amplifiers 76 and 78 rises abruptly to, for example, 3 dB.

During the time periods between the time points $t_1$ and $t_2$, $t_2$ and $t_3$, $t_4$ and $t_5$, $t_6$ and $t_7$, $t_7$ and $t_8$, the output signals $L''_f$ and $R''_f$ corresponding to a pair of the front-left and front-right positions or the output signals $L''_b$ and $R''_b$ corresponding to a pair of the back-left and backright positions are only obtained. Meanwhile, during the time periods between the time points $t_3$ and $t_4$, $t_5$ and $t_6$, and after the time point $t_8$, since the output from the rectifier 164 and the output from the rectifier 166 both have a certain magnitude occasionally and are same in content occasionally, the difference between these outputs becomes zero to deliver both the output signals $L''_f$ and $R''_f$ and the output signals $L''_b$ and $R''_b$, or no such output signals due to the fact that no signals are applied thereto.

At the time points $t_2$ and $t_7$, the reason why the gains of the amplifiers 74, 80 and 76, 78 rise abruptly to 3 dB from the previous small values as shown in FIGS. 3B and 3C is that the condition is changed from one that either one of the output signals $L''_f$, $R''_f$ and $L''_b$, $R''_b$ is obtained to one that the other one of the output signals is obtained. In this case, the gain of the amplifiers corresponding to the pair of the output signals which are newly obtained is rapidly increased, so that there may be no problem. It is, however, not preferred for the reason that at the time points $t_3$, $t_5$ and $t_8$ shown in FIGS. 3A, 3B and 3C the gains of the amplifiers 74, 80 or 76, 78 rise abruptly to 0dB from the previous small values. In other words, during the time periods between the time points $t_3$ and $t_4$, $t_5$ and $t_6$ and after the time point $t_8$, the output signals $L''_f$, $R''_f$ and the output signals $L''_b$, $R''_b$ are both obtained or both of them are not obtained. In fact, the former state occurs rarely and the latter state occurs in almost all cases. In this latter state, when the state is changed from one that at the time points $t_3$, $t_5$ and $t_8$ either one of the output signals $L''_f$, $R''_f$ and $L''_b$, $R''_b$ is obtained to one that both of them are not obtained, the gain of the amplifiers 74, 80 or 76, 78 corresponding to the output signals which have not be obtained in the former state are restored immediately to 0 dB as shown in FIGS. 3B and 3C. At this time, noises generated in the respective electric circuits are reproduced abruptly in high level, which is not desirable. This fact, in other words, means that the reproduces sound may skip from one loudspeaker to other loudspeakers with a feeling of unnaturalness for the listener.

In order to avoid such a disadvantage when either one of the output signals $L''_f$, $R''_f$ and $L''_b$, $R''_b$ is obtained only, the change in gain of the amplifiers 74, 80 or 76, 78 corresponding to the other output signals may be made slowly in its falling down point to keep the minimum value of the gain not so low, but this also may introduce deterioration of the sense of position.

Figure 4:
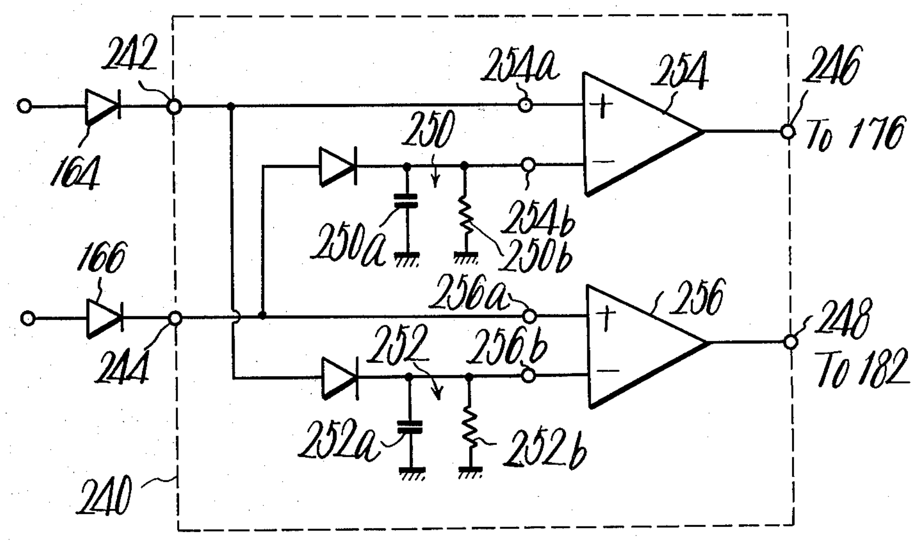
FIG. 4 is a schematic diagram illustrating a part of logic circut means in accordance with one embodiment of the invention.

The present invention comprises a novel logic circuit to eliminate such a disadvantage mentioned above. A circuit 240 shown in FIG. 4 is an example of such a logic circuit. The circuit 240 is provided with two input terminals 242 and 244 and also two output terminals 246 and 248. The input terminals 242 and 244 are respectively connected to the output sides of the rectifiers 164 and 166 mentioned with reference to FIG. 2B, while the output terminals 246 and 248 are respectively connected to the summing junctions 176 and 182 in FIG. 2B. The circuit 240 includes two differential amplifiers 254 and 256 and two time constant circuits 250 and 252. The input terminal 242 is directly connected to, for example, a positive input terminal 254$a$ of the differential amplifier 254 while the input terminal 244 is directly connected to, for example, a positive input terminal 256$a$ of the differential amplifier 256. The input terminal 242 is also connected to, for example, a negative input terminal 256$b$ of the differential amplifier 256 through the time constant circuit 252 which consists of, for example, a capacitor 252$a$ and a resistor 252$b$ connected in parallel between the terminal 256$b$ and the circuit ground. The input terminal 244 is also connected to, for example, a negative input terminal 254$b$ through the time constant circuit 250 which consists of, for example, a capacitor 250$a$ and a resistor 250$b$ connected in parallel between the terminal 254$b$ and the circuit ground. Thus, the signal applied to the input terminal 242 is supplied to the positive terminal 254$a$ of the differential amplifier 254 and also to the negative input terminal 256$b$ of the differential amplifier 256 through the time constant circuit 252, whilee the signal applied to the input terminal 244 is supplied to the positive input terminal 256$a$ of the differential amplifier 256 and also to the negative input terminal 254$b$ of the differential amplifier 254 through the time constant circuit 250.

With the circuit 240 constructed described as above, the gains of the amplifiers 74, 80 and 76, 78 change similarly as previously described during the time periods between the time points $t_1$ and $t_2$, $t_2$ and $t_3$, $t_4$ and $t_5$, $t_6$ and $t_7$, and $t_7$ and $t_8$ in FIG. 5. That is, during the time period between the time points $t_1$ and $t_2$ the output signal from the amplifier 164 is applied to the differential amplifier 254 at its positive input terminal 254$a$ the positive output signal of which is then applied to the gain control amplifiers 74 and 80, respectively. At the same time, the output signal from the amplifier 164 is also applied through the time constant circuit 252 to the differential amplifier 256 at its negative input terminal 256$b$ the negative output signal of which is then supplied to the gain control amplifiers 76 and 78, respectively.

Figures 5A, 5B, 5C:
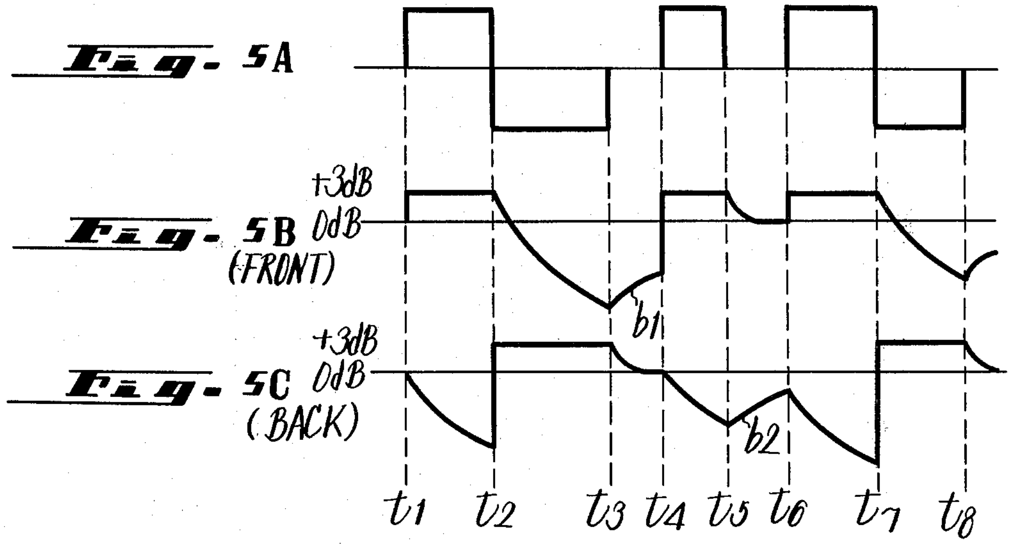
FIGS. 5A to 5C, inclusive, are waveform diagrams employed for explaining the operation and advantage of the decoder shown in FIGS. 2A and 2B with the logic circuit means illustrated in FIG. 4.

FIGS. 5B and 5C show the response characteristics of the gain control amplifiers 74 to 80, inclusive.

It will be understood that during the time interval between the time points $t_2$ and $t_3$ the operations counter to those described above are carried out in the respective circuits. It will be noted, however, that the output from the rectifier 166 is charged in the capacitor 250$a$ during the time interval between the time points $t_2$ and $t_3$. Therefore, when no output signals are derived from both the rectifiers 164 and 166, the electric charge stored in the capacitor 250$a$ of the time constant circuit 250 is discharged gradually with a predetermined time constant during the time period, between $t_3$ and $t_4$. Accordingly, the output signal of the differential amplifier 254 gradually approaches to zero from a predetermined negative value with a certain function. In other words, the response of the gain control amplifiers 74 and 80 does not arrive at zero from a predetermined minus level suddenly, but instead their respective gains rise with a predetermined function. This is shown in FIG. 5B by a wave portion $b_1$. The reason why the gain rises abruptly at the time point $t_4$ is that the rectifier 164 delivers an output signal and hence an input signal applied to the input terminal 254$a$ of the differential amplifier 254 becomes greater than that applied to the input terminal 254$b$ which then delivers a positive output signal. On the other hand, during the time period between $t_5$ and $t_6$ the gain control signal applied from the differential amplifier 256 to the gain control amplifier 76 and 78 decreases gradually by the action of the time constant circuit 252 and the gain of the amplifiers 76 and 78 rises gradually with a predetermined time constant as shown by a wave portion $b_2$ in FIG. 5C.

With the invention since, at the midway of the time period within which one of the output signals $L''_f$, $R''_f$, or $L''_b$, $R''_b$ is not obtained from one of the amplifiers 74, 80 or 76, 78, when the other one of the output signals $L''_b$, $R''_b$ or $L''_f$, $R''_f$ is not obtained from the other one of the amplifiers 76, 78 or 74, 80, the gain of the former amplifiers 74, 80 or 76, 78 is made to rise gradually instead or rising abruptly, no unnatural sense is given to a listener and no skipping of reproduced sound occurs. As a result of this, since it is possible in the invention that when one of the output signals $L''_f$, $R''_f$ and $L''_b$, $R''_b$ is only obtained, the gain of one of the amplifiers 74, 80 and 76, 78 which corresponds to the other one of the output signals is made abrupt in its falling to make the minimum of the gain as low as possible, the sense of positioning of reproduced sound is increased and natural aural sense is obtained.

When gain control amplifiers of negative polarity are employed, it is necessary to inverse the polarity of control signals and also to change the connection points of the time constant circuits to the differential amplifier.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. In a quadraphonic sound reproducer having a decoder for separating first and second composite signals $L_T$ and $R_T$ into four separate output signals containing left front, left back, right back and right front signals $L_f$, $L_b$, $R_b$ and $R_f$ as dominant components and for transmitting the separated output signals through individual variable gain amplifiers disposed in respective signal channels, and wherein the gains of said variable gain amplifiers are controlled by gain controlling signals produced by front-back logic means and by wavematching logic means, the latter including first logic signal producing means for producing a first logic signal which is a function of the $L_f$ and $R_f$ signal components included in said composite signals and second logic signal producing means for producing a second logic signal which is a function of the $R_b$ and $L_b$ signal components included in said composite signals, apparatus for gradually changing the gains of said variable gain amplifiers as the signal components contained in said composite signals change comprising:

a first differential amplifier having a positive input terminal for receiving said first logic signal, and a negative input terminal;

a first time constant circuit connected to said first differential amplifier negative input terminal for receiving said second logic signal, such that said first differential amplifier negative input terminal is supplied with a signal for a predetermined time duration subsequent to the cessation of said second logic signal;

a second differential amplifier having a positive input terminal for receiving said second logic signal, and a negative input terminal;

a second time constant circuit connected to said second differential amplifier negative input terminal for receiving said first logic signal, such that said second differential amplifier negative input terminal is supplied with a signal for a predetermined time duration subsequent to the cessation of said first logic signal; and means for supplying the outputs of said first and second differential amplifiers to said individual variable gain amplifiers as at least portions of said gain controlling signals.

2. In a quadraphonic sound signal decoder wherein first and second composite signals $L_T$ and $R_T$ containing left front, right front, left back and right back signal components $L_f$, $R_f$, $L_b$, and $R_b$ are separated into four separate output signals containing in phase $L_f$, $L_b$, $R_b$, and $R_f$ signals as dominant components to be transmitted through respective variable gain amplifiers disposed in separate signal channels, and including wave-matching logic means for receiving said first and second composite signals out of phase with respect to each other by 90° to produce therefrom a first logic signal representative of the sum of the absolute magnitudes of the $L_f$ and $R_f$ signal components and a second locig signal representative of the sum of the absolute magnitudes of the $R_b$ and $L_b$ signal components, and further including front-back logic means for receiving said first and second composite signals to produce therefrom a third logic signal representative of the summation of said first and second composite signals and a fourth logic signal representative of the difference between said first and second composite signals, apparatus comprising:

first subtracting means included in said wave-matching logic means for subtracting said second logic signal from said first logic signal to produce a first control signal;

second subtracting means included in said wave-matching logic means for subtracting said first logic signal from said second logic signal to produce a second control signal;

third subtracting means included in said front-back logic means for subtracting said fourth logic signal from said third logic signal to produce a third control signal;

fourth subtracting means included in said front-back logic means for subtracting said third logic signal from said fourth logic signal to produce a fourth control signal;

first summing means for summing said first and third control signals to produce a gain controlling signal adapted to control the gain of the variable gain amplifiers through which pass the separate output signals containing $L_f$ and $R_f$ signals as dominant components;

second summing means for summing said second and fourth control signals to produce a gain controlling signal adapted to control the gain of the variable amplifiers through which pass the separate output signals containing $L_b$ and $R_b$ signals as dominant components; and wherein at least said first and second subtracting means each comprises a differential amplifier having positive and negative input terminals, means for directly supplying to said positive input terminal the one logic signal from which the other logic signal is subtracted, and a time constant circuit to said negative input terminal and through which the other logic signal which is to be subtracted is supplied, such that said negative input terminal is supplied with a signal for a predetermined time duration subsequent to the cessation of said other logic signal.

* * * * *